UNITED STATES PATENT OFFICE.

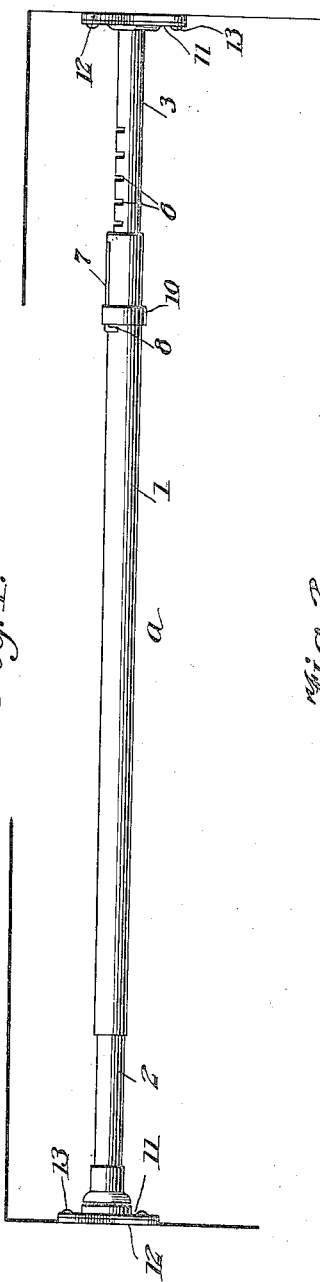
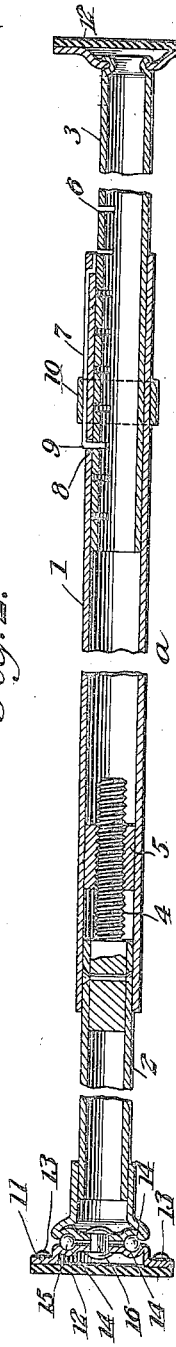
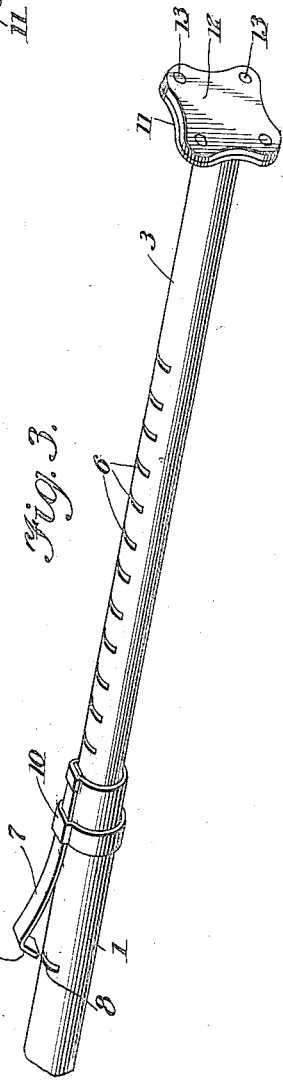

EDNA I. HAMMER, OF AMES, IOWA.

ADJUSTABLE SUPPORTING-ROD.

1,253,486.   Specification of Letters Patent.   Patented Jan. 15, 1918.

Application filed March 16, 1917. Serial No. 155,352.

*To all whom it may concern:*

Be it known that I, EDNA I. HAMMER, a citizen of the United States, residing at Ames, in the county of Story and State of Iowa, have invented new and useful Improvements in Adjustable Supporting-Rods, of which the following is a specification.

My invention relates to adjustable supporting rods and has for its objects: First to provide an efficient adjustable supporting rod for hanging curtains and kindred purposes, second, to provide an adjustable supporting rod having ends which are adapted to engage oppositely disposed surfaces and support the rod therefrom without marring said surfaces in any way, thirdly to provide an adjustable supporting rod, having ends adapted to engage oppositely disposed surfaces, the nature of the adjustment being such, that a wide range of adjustment is attainable.

With these and other objects in view which are hereinafter more fully described and particularly pointed out in the drawings, I provide the mechanism thereof illustrated in the accompanying drawings, in which:—

Figure 1 is a side elevation of an adjustable rod embodying my invention,

Fig. 2 is a sectional side elevation of the same,

Fig. 3 is a detail sectional partial side view of a portion of the mechanism.

Like characters of reference indicate like parts in the various views.

In the drawings $a$ designates the rod generally. The rod is composed of a center tube 1 having an outer tube 2 adapted to telescope within said center tube from one end, and having an outer tube 3 adapted to telescope within said center tube from the other end thereof. The outer tube 2 has a screw threaded portion 4 at its inner end adapted to engage a threaded bushing 5 secured upon the inner surface of tube 1. By means of the screw threaded engagement of tube 2 with tube 1, said tubes are adjustably secured together. The tube 3 is provided with a series of transverse slots 6. A spring catch 7 has one end thereof secured to the end of tube 1 adjacent to said tube 3, and said catch extends longitudinally of said tube 1. The free end 9 of said catch is adapted to engage a transverse slot 8 in the tube 1 and to extend therethrough into the inclosure of the tube 1. The slots 6 are so positioned relative to the slot 8 that when any one of them is in registry with the slot 8 the free end 9 of said catch will readily engage the same. A slip ring 10 is mounted upon the tube 1 and adapted to slip over the free end of catch 7 and to depress the same so that the free end 9 will engage a slot in the tube 3.

The outwardly extending ends of tubes 2 and 3 are provided with flanges 11 which have their outer faces covered with friction members 12 which are secured to said flanges by means of rivets 13. The tube 2 is enlarged near its outer end so that it may be readily rotated.

When the device is installed as illustrated in Fig. 1, the tube 2 is screw threaded upon the tube 1 to its innermost telescope relation therewith; the tube 3 is then adjusted in relation to tube 1 so that the rod fits loosely in between the oppositely disposed surfaces to which the rod is to be attached. The rod is then held in position and the tube 2 is screw threaded out of the tube 1 until the friction members 12 are in tight engagement with the oppositely disposed surfaces. The friction thus created serves to hold the rod in place.

By the above described mechanism an adjustable rod is provided having means for securing it to oppositely disposed surfaces without marring said surfaces in any way or requiring any permanent fixtures to be attached thereto.

Having thus fully described my invention, I claim:

1. In a device of the character described, a tube, a second tube adapted to telescope within said first mentioned tube, a screw threaded engagement between them, a third tube adapted to telescope within said first mentioned tube and having a series of transverse slots formed at intervals along its surface, a catch mounted upon said first mentioned tube, the free end of said catch being adapted to engage said slots, and means for locking said catch in engagement with any one of said slots.

2. In a device of the character described, a tube, a second tube adapted to telescope within said first mentioned tube, a screw threaded engagement between them, a third tube adapted to telescope within said first mentioned tube and having a series of transverse slots formed at intervals along its surface, a catch mounted upon said first mentioned tube, the free end of said catch being adapted to engage said slots, a means for locking said catch in engagement with any one of said slots, and means at the ends of the free ends of said second mentioned and third mentioned tubes for engagement with oppositely disposed surfaces.

3. In a device of the character described, a tube, a second tube adapted to telescope within said first mentioned tube, a screw threaded engagement between them, a third tube adapted to telescope within said first mentioned tube and having a series of transverse slots formed at intervals along said tube, a catch mounted upon said first mentioned tube, the free end of said catch being adapted to engage said slots, and a slip ring adapted to engage said catch and hold it in engagement with any one of said slots.

4. In a device of the character described, a tube, a second tube adapted to telescope within said first mentioned tube, a screw threaded engagement between them, a third tube adapted to telescope within said first mentioned tube and having a series of transverse slots formed at intervals along said tube, a catch mounted upon said first mentioned tube, the free end of said catch being adapted to engage said slots, a slip ring adapted to engage said catch and hold it in engagement with any one of said slots, and means at the free ends of the second and third mentioned tube for engagement with oppositely disposed surfaces.

In testimony whereof I affix my signature.

EDNA I. HAMMER.